(12) United States Patent
Walker

(10) Patent No.: US 11,377,236 B2
(45) Date of Patent: Jul. 5, 2022

(54) METHOD FOR ATTACHING A HEAT-EMITTING DEVICE, SPACECRAFT WALL AND SPACECRAFT

(71) Applicant: AIRBUS DEFENCE AND SPACE SAS, Toulouse (FR)

(72) Inventor: Andrew Walker, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/414,275

(22) PCT Filed: Dec. 18, 2019

(86) PCT No.: PCT/FR2019/053141
§ 371 (c)(1),
(2) Date: Jun. 15, 2021

(87) PCT Pub. No.: WO2020/128318
PCT Pub. Date: Jun. 25, 2020

(65) Prior Publication Data
US 2022/0041304 A1 Feb. 10, 2022

(30) Foreign Application Priority Data
Dec. 18, 2018 (FR) ..................... 18 73211

(51) Int. Cl.
*B64G 1/50* (2006.01)
(52) U.S. Cl.
CPC ............. *B64G 1/503* (2013.01); *B64G 1/506* (2013.01)
(58) Field of Classification Search
CPC .......... B64G 1/503; B64G 1/506; B64G 1/50; B64G 1/58; B64G 1/66; B64G 1/1007; F28D 15/0275; F28D 2021/0021
See application file for complete search history.

(56) References Cited

U.S. PATENT DOCUMENTS 5,682,943 A * 11/1997 Yao ..................... F28D 15/0233
165/104.21
5,735,489 A 4/1998 Drolen et al.
(Continued)

FOREIGN PATENT DOCUMENTS

FR    2 735 565    12/1996

OTHER PUBLICATIONS

French Search Report and Written Opinion of French Application No. 1873211 dated Nov. 5, 2019, 6 pages.
(Continued)

*Primary Examiner* — Medhat Badawi
*Assistant Examiner* — Vicente Rodriguez
(74) *Attorney, Agent, or Firm* — Nixon & Vanderhye P.C.

(57) ABSTRACT

A method for attaching a heat-emitting device and a capillary heat pipe to a panel of a spacecraft wall is disclosed including the steps of: a) positioning a capillary heat pipe on a portion of the panel; attaching female attachment bodies to the panel, the female attachment bodies protruding relative to the capillary heat pipe; c) placing a thermally-conductive and self-curing paste over a portion of the capillary heat pipe or over a heat-emitting device; d) placing a heat-emitting device on the thermally-conductive and self-curing paste and on the female attachment bodies, said heat-emitting device bearing against and being in direct contact with the female attachment bodies, and e) attaching the heat-emitting device and said capillary heat pipe to the panel by attaching male attachment members to the female attachment bodies.

20 Claims, 6 Drawing Sheets

(56) References Cited

U.S. PATENT DOCUMENTS

| | | | | | |
|---|---|---|---|---|---|
| 5,826,645 | A | * | 10/1998 | Meyer, IV | H01L 23/427 165/104.33 |
| 6,131,646 | A | * | 10/2000 | Kelley | B64G 1/50 165/80.1 |
| 6,938,679 | B1 | * | 9/2005 | Ito | B64D 47/00 165/104.21 |
| 7,477,515 | B2 | * | 1/2009 | Tsai | H01L 23/427 257/E23.088 |
| 2013/0233516 | A1 | * | 9/2013 | Aston | B64G 1/506 165/104.21 |
| 2015/0122454 | A1 | * | 5/2015 | Houghton | F28D 15/04 165/47 |

OTHER PUBLICATIONS

French International Search Report and its English translation for PCT/FR2019/053141 dated May 8, 2020, 5 pages.
French Written Opinion of the ISA for PCT/FR2019/053141 dated May 8, 2020, 6 pages.

* cited by examiner

METHOD FOR ATTACHING A HEAT-EMITTING DEVICE, SPACECRAFT WALL AND SPACECRAFT

CROSS RELATED APPLICATIONS

This application is the U.S. national phase of International Application No. PCT/FR2019/053141 filed Dec. 18, 2019, which claims priority to French Patent Application No. 18 73211 filed on Dec. 18, 2018, the entire contents of each of which are hereby incorporated by reference.

BACKGROUND

The invention lies in the field of spacecraft and in particular in the field of cooling the payload of spacecraft.

Spacecraft contain a large number of electronic devices which constitute the payload. When these electronic devices are in operation, they emit heat. This heat is transported by capillary heat pipes to radiators which discharge it into space. However, in space, the vacuum or more accurately the absence of atmosphere is non-conductive. As a result, even a very small space between an electronic device and a capillary heat pipe can prevent the transfer of heat between them.

To ensure good thermal conduction between the electronic devices 2 and the capillary heat pipes 4, a thermally conductive filler is necessary to enable the continuous passage of heat between them. The filler is placed between the electronic device and the capillary heat pipe, as shown in FIG. 1. In the space industry, two types of thermally conductive filler are widely used:

- A "dry" type of filler composed of a sheet of thermally conductive material. For example, a sheet of thermally conductive material of the registered trademark "Sigraflex", or a sheet composed of compressed graphite of the registered trademark "e-graf", may be used.
- A "liquid" type of filler—typically silicone resins which are applied in liquid form and then harden to form a solid mass.

Grease-type fillers, which remain in a fluid or paste state, are widely used for terrestrial applications but are generally not used in space applications due to contamination concerns. An example of an installation using a "dry" type filler is described below. This method is long and complex. In fact, this method firstly comprises a step of cutting pads from strips of graphite, to the dimensions of the various electronic devices 2.

As shown in FIG. 1, capillary heat pipes 4 having wide lateral edges 8 are generally mounted on the panels 10 of the spacecraft. These capillary heat pipes 4 have attachment holes 14 at provided attachment locations. The mounting holes must be prepared before installing the heat pipe on the spacecraft. Preparation of the mounting holes is done by the heat pipe supplier or by the spacecraft manufacturer. Preparation of the mounting holes represents a significant workload. The satellite manufacturer must prepare a drawing that specifies the number and location of the attachment points. The heat pipe is machined according to the drawing, and finally the heat pipe is installed on the spacecraft, ready for the installation of the electronic device. This means that each of the machined heat pipes is specific to a particular position of the spacecraft, i.e. they are all unique and the position of the holes cannot be normalized.

If an electronic component 2 is to be moved or an electronic component is to be replaced by another one of different dimension, new heat pipes 4 must be ordered. These steps complicate and lengthen the manufacturing time of the spacecraft.

In a "dry" type installation, graphite pads 6 are pressed against the surface of the electronic device 2 and against the surface of the capillary heat pipe 4 so that the carbon can try to fill the micro-roughnesses thereof.

To achieve this pressing, the spacing between the upper face of the capillary heat pipe 4 and the upper face of the spacer 16 must correspond very exactly to a predefined spacing. This spacing is measured for each attachment point by an operator, using a gauge. This spacing is precisely controlled by adding one or more washers 17 that are 50 µm thick. This process, carried out manually, is long and tedious. Furthermore, to ensure that the carbon pads are pressed into the micro-roughnesses of the electronic devices 2 and heat pipes 4, significant force is applied to the attaching screws 12. This significant force generates tensions which have the consequence of slightly bending the electronic component 2, the heat pipe 4, and the panel 10 even if these are made of stiff materials such as aluminum.

Due to such bending, the spacing between the electronic device and the heat pipe is not constant and thermal conduction is not ensured over the entire surface of the electronic device 2. As a result, the overall thermal conduction is not very high.

To increase the thermal conduction, spacecraft manufacturers have therefore increased the number of attachment points. However, as described above, the placement of attachment points is long and complex, and requires more mounting holes in the heat pipes.

Finally, for certain electronic components, for example such as output multiplexers, the large number of attachment points and the resulting distortion of the electronic component has a direct effect on performance and can modify the resonance of the cavities and deteriorate the quality of the transmitted signal.

The invention overcomes these disadvantages.

SUMMARY

A first object of the invention is to provide a faster and simpler method for attaching a heat-emitting device and a capillary heat pipe to a spacecraft panel.

A second object of the invention is to provide an attachment method that uses a larger number of standard components.

A third object of the invention is to provide a less expensive attachment method.

A fourth object of the invention is to provide a spacecraft wall having better thermal conduction between the electronic components and the heat pipes.

To this end, the invention provides a method for attaching a heat-emitting device and a capillary heat pipe to a panel of a spacecraft wall, said method comprising the following steps:

a) arranging at least one capillary heat pipe on at least a portion of the panel, b) attaching female attachment bodies to the panel, the female attachment bodies protruding relative to said at least one capillary heat pipe, c) placing a thermally-conductive and self-curing paste on at least a portion of the at least one capillary heat pipe or on at least one heat-emitting device, d) placing at least one heat-emitting device on the thermally-conductive and self-curing paste and on the female attachment bodies, said heat-emitting device bearing against the female attachment bodies, said heat-emitting device being in direct contact with the female attachment bodies, and e) attaching the heat-emitting device and said at least one capillary heat pipe to the panel by attaching male attachment members to the female attachment bodies.

The characteristics set forth in the following paragraphs may optionally be implemented. They may be implemented independently of each other or in combination with each other:

The thermally-conductive paste comprises a silicone resin containing alumina powder.

The male attachment member comprises a stud and at least one nut.

The step of placing the thermally-conductive paste on the capillary heat pipe is implemented by depositing drops or a thin line of thermally-conductive paste, and the amount of thermally-conductive paste deposited on the at least one capillary heat pipe is at least one and a half times greater than the amount of thermally-conductive paste needed to fill only the space between the capillary heat pipe and the heat-emitting device.

The method further comprises a step of waiting for the viscosity of the thermally-conductive paste to increase to a threshold value.

The capillary heat pipe comprises a hollow tube and two support plates arranged one on either side of the hollow tube, and said support plates have a width substantially equal to the diameter of the hollow tube.

The female attachment bodies are attached to the panel so as to protrude relative to said at least one capillary heat pipe in a direction perpendicular to a main face of the panel.

The female attachment body comprises at least one threaded insert.

The female attachment body further comprises a spacer comprising a hollow channel, said spacer being arranged in the axial extension of the threaded insert.

The thermally-conductive paste comprises a component among: a component of registered trademark "Nusil CV2946" and a component of registered trademark MAPSIL TA66.

According to another aspect, the invention also relates to a spacecraft wall comprising:

a panel, at least one capillary heat pipe arranged on at least a portion of the panel, female attachment bodies attached to the panel so as to protrude relative to said at least one capillary heat pipe, at least one heat-emitting device carried by and in direct contact with said female attachment bodies, a layer of thermally-conductive and self-curing paste arranged between said at least one capillary heat pipe and the heat-emitting device, and a male attachment member suitable for attaching said heat-emitting device to the female attachment body.

The features set forth in the following paragraphs may optionally be implemented. They may be implemented independently of each other or in combination with each other:

The thermally-conductive paste comprises a silicone resin containing alumina powder.

The male attachment body comprises a stud and at least one nut.

Said at least one capillary heat pipe comprises a hollow tube and two support plates arranged one on either side of the hollow tube, and said support plates have a width substantially equal to the diameter of the hollow tube.

The female attachment body protrudes relative to said at least one capillary heat pipe in a direction perpendicular to a main face of the panel.

The female attachment member comprises at least one threaded insert.

The female attachment body comprises a spacer comprising a hollow channel, said spacer protruding relative to the support plates of said capillary heat pipe and being arranged in the axial extension of the threaded insert.

The thermally-conductive paste comprises a component among: a component of registered trademark "Nusil CV2946" and a component of registered trademark MAPSIL TA66.

Said heat-emitting device is a device among: an amplifier, a radiofrequency electronic component, a digital electronic component, a processor, an electric power supply.

The invention also relates to a spacecraft comprising at least one spacecraft wall arranged according to the features mentioned above.

Advantageously, the stud adapts to a wide variety of attachment distances. It makes it possible to avoid managing a large number of screws of different sizes. The use of a stud simplifies assembly and accelerates the speed of manufacture of the spacecraft. The use of a stud simplifies the work of purchasing and managing assembly parts.

Alternatively, the male attachment member comprises a screw.

Advantageously, an overflow of paste allows visually verifying that the conductive paste has not been forgotten and that a sufficient amount of thermally-conductive paste has been applied to cover the entire surface of the heat pipe. Since the entire surface of the heat pipe and of the heat-emitting device is covered with the thermally-conductive paste, thermal conduction is improved between the heat-emitting device and the heat pipe.

Advantageously, the use of a heat pipe with no lateral edges makes it possible to avoid having to order heat pipes with attachment holes at the right locations. The attachment method is thus simplified. Advantageously, the manufacturing time of a spacecraft is thus reduced.

BRIEF DESCRIPTION OF DRAWINGS

Other features, details and advantages of the invention will become apparent from reading the detailed description below, and from analyzing the appended drawings, in which.

DETAILED DESCRIPTION OF THE EMBODIMENTS

The drawings and the description below contain, for the most part, elements that are certain in nature. Therefore not only can they serve to provide a better understanding of the invention, but where appropriate can also contribute to its definition.

Figure 5:
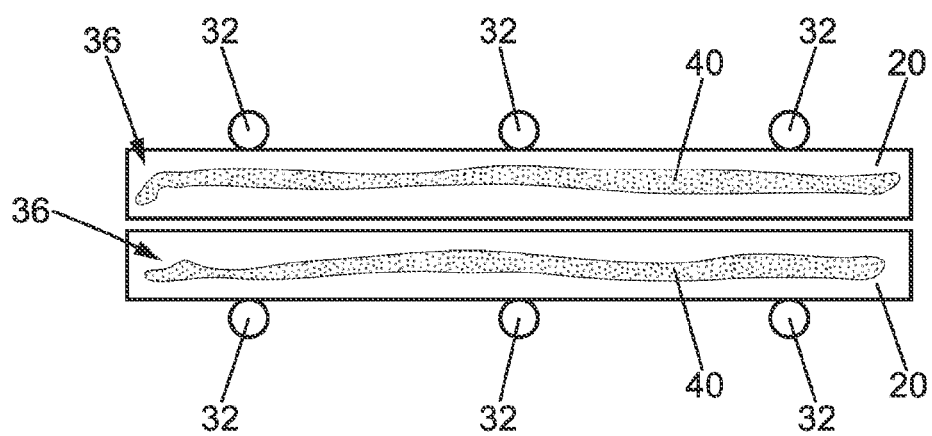
FIG. 5 is a schematic top view of two capillary heat pipes during a step of the attachment method of the invention.

By convention, in the description which follows, the terms "lower", "upper", "right" and "left" are defined when the wall of the spacecraft according to the invention is arranged as illustrated in FIG. 5, and are in no way limiting.

Figure 1:
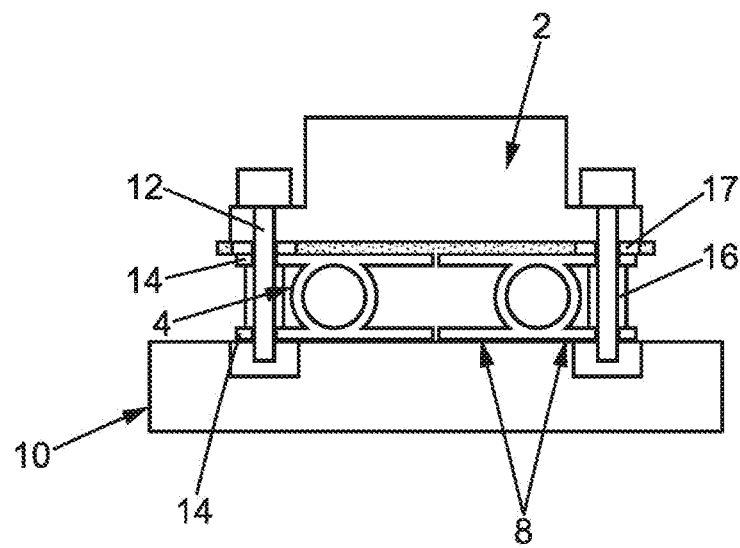
FIG. 1 is a schematic cross-sectional view of a spacecraft wall according to the prior art, said cross-section being at the attaching screws of an electronic component.
Figure 2:
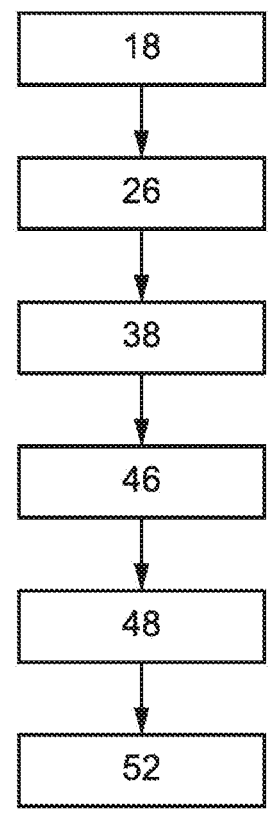
FIG. 2 is a diagram of the attachment steps of the method according to a first embodiment of the invention.
Figure 3:
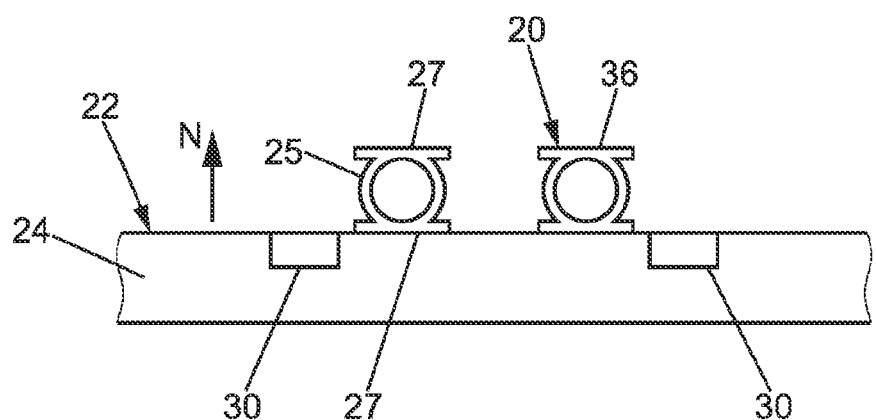
FIG. 3 is a schematic cross-sectional view of a spacecraft wall during an intermediate step of the attachment method illustrated in FIG. 2.

Referring to FIGS. 2 and 3, the manufacturing method according to the first embodiment of the invention begins with a step 18 during which capillary heat pipes 20, for example two capillary heat pipes 20, are arranged on a main face 22 of a panel 24 generally used in the manufacture of a spacecraft wall. The capillary heat pipes 20 are arranged parallel to one another and preferably next to one another. The capillary heat pipes 20 are intended to receive a heat transfer fluid suitable for transmitting heat to the radiators of the spacecraft.

The capillary heat pipes 20 comprise a hollow tube 25 and two support plates 27 arranged parallel to one another, one on either side and diametrically opposite. The support plates 27 have the form of a plate whose length is equal to the length of the hollow tube 25.

Preferably, the support plates 27 have a width substantially equal to the diameter of the hollow tube 25. They are not extended by lateral edges 8, as are the capillary heat pipes generally used in the prior art. Thus, the support plates 27 do not interfere with the attachments. They have no holes and they are the same width along their entire length.

During a step 26, the female attachment bodies 33 are attached to the panel 24. In the first embodiment, the female attachment bodies 33 comprise two threaded inserts 28 mounted in an orifice 30 of the panel 24 and two spacers 32 placed on the threaded inserts 28.

The threaded inserts 28 have the form of a socket with a threaded central channel. Alternatively, a threaded hole is made directly in the panel 24.

Each spacer 32 is provided with a through channel arranged as an axial extension of each threaded insert 28. The height of the spacers 32 and/or the depth of insertion of the threaded inserts 28 into the panel 24 is established so that the upper face 34 of the spacers protrudes relative to the upper face 36 of the heat pipes in a direction N, the direction N being perpendicular to the main face 22 of the panel. Thus, a height difference D of between 0.2 and 0.5 millimeter is preferably established between the upper face 34 of the spacers and the upper face 36 of the heat pipes. Alternatively, step 26 is carried out before step 18.

Figure 4:
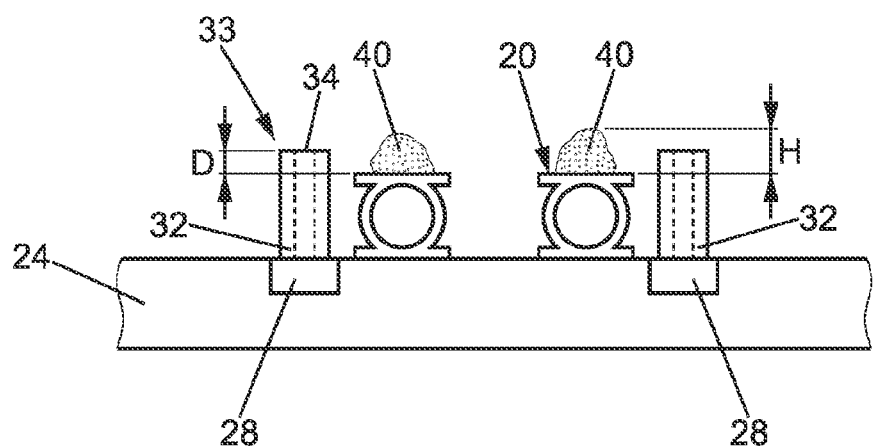
FIG. 4 is a schematic cross-sectional view of a spacecraft wall during another intermediate step of the attachment method illustrated in FIG. 2.

During a step 38 illustrated in FIGS. 2, 4, and 5, a thermally-conductive paste 40 is placed on at least a portion of the capillary heat pipes 20.

Preferably, the thermally-conductive paste 40 is arranged in the form of a dripping or thin line extending longitudinally over a portion of the upper face 36 of each capillary heat pipe 20. The thermally-conductive paste is applied, for example, using a gun or a pouch equipped with a conical tip that is open at the end. Advantageously, there is an excess of thermally-conductive paste so that, when the heat-emitting device is applied to the paste, some of the paste will come out at the sides of the heat-emitting device.

Advantageously, the amount of thermally-conductive paste 40 deposited on each capillary heat pipe 20 is at least one and a half times greater, and preferably at least two times greater, than the amount of thermally-conductive paste 40 needed to fill only the space between the capillary heat pipe 20 and the heat-emitting device 42. This amount of thermally-conductive paste needed to fill only the space between the capillary heat pipe 20 and the heat-emitting device 42 can be calculated for each capillary heat pipe, from the following formula:

$$Vr = D \times I \times L$$

where:

Vr is the amount needed,

D is the height difference D between the upper face 34 of the spacers and the upper face 36 of the heat pipe, I is the width of the heat pipe, and L is the length of the heat pipe.

According to a variant, not shown, the thermally-conductive paste 40 is deposited in the form of droplets distributed over the upper face 36. In this case as well, the height H of these paste droplets is, for example, between 0.3 and 0.7 millimeter. Preferably, the height H of these paste droplets is substantially equal to 0.5 millimeter.

To simplify its application, the thermally-conductive paste 40 is preferably thixotropic. In particular, the viscosity of the thermally-conductive paste 40 increases over time and eventually becomes solid. The thermally-conductive paste 40 is thus a self-curing paste.

The thermally-conductive paste 40 typically comprises a silicone resin or some other thermosetting resin.

Advantageously, this silicone resin contains alumina powder or another thermally conductive material, in order to provide high thermal conductivity.

Advantageously, the thermally-conductive paste 40 has a thermal conductivity greater than 0.5 Watts per meter-Kelvin (W/m/K).

For example, the thermally-conductive paste 40 is a component of registered trademark "Nusil CV2946". According to another example, the thermally-conductive paste 40 is a component of registered trademark MAPSIL TA66.

Alternatively, the thermally-conductive paste 40 is placed on the lower face of the heat-emitting device 42.

After deposition of the thermally-conductive paste 40, during a step 46 a heat-emitting device 42 is placed on the thermally-conductive paste 40 and on the female attachment bodies 33. This step must be carried out while the paste is still able to flow, meaning before the paste has completely hardened.

This heat-emitting device 42 consists of any type of device which generates heat and which is generally mounted on the panels of a spacecraft. This heat-emitting device 42 may be an electronic component, for example such as an amplifier, a radiofrequency electronic component, a digital electronic component, a processor, or an electric power supply.

This heat-emitting device 42 has attachment tabs 43 or edges provided with attachment through-holes 45. The heat-emitting device 42 is placed so that these attachment tabs 43 or edges are positioned in line with the female attachment bodies 33.

When the heat-emitting device 42 is placed on the female attachment bodies 33, due to its weight and the tension in the bolts the heat-emitting device 42 presses on the thermally-conductive paste 40 on the upper face 36 of the capillary heat pipe. The thermally-conductive paste 40 is distributed over a large portion of the upper face 36 of the capillary heat pipes 20, until the upper face of the thermally-conductive layer 50 is at the same level as the upper face of the spacers 32 and the heat-emitting device 42 is bearing against the female attachment bodies 33.

The heat-emitting device 42 is in direct contact with the female attachment bodies 33. In particular, in this embodiment, the heat-emitting device 42 is bearing against and is in direct contact with the spacers 32.

Figure 6:
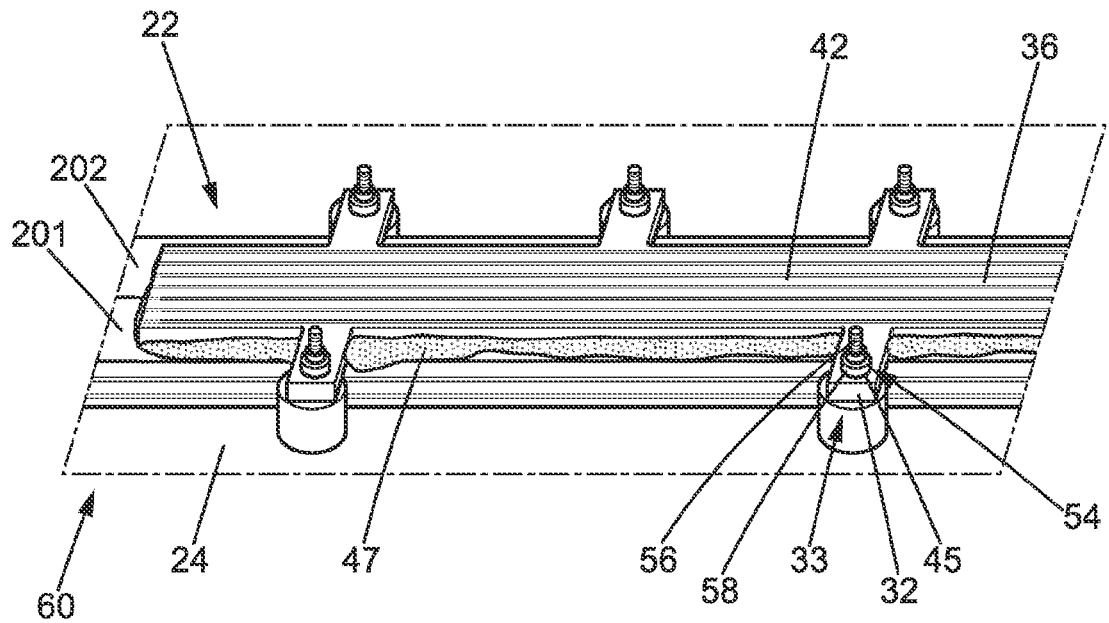
FIG. 6 is a perspective view of an exemplary portion of a spacecraft wall.
Figure 7:
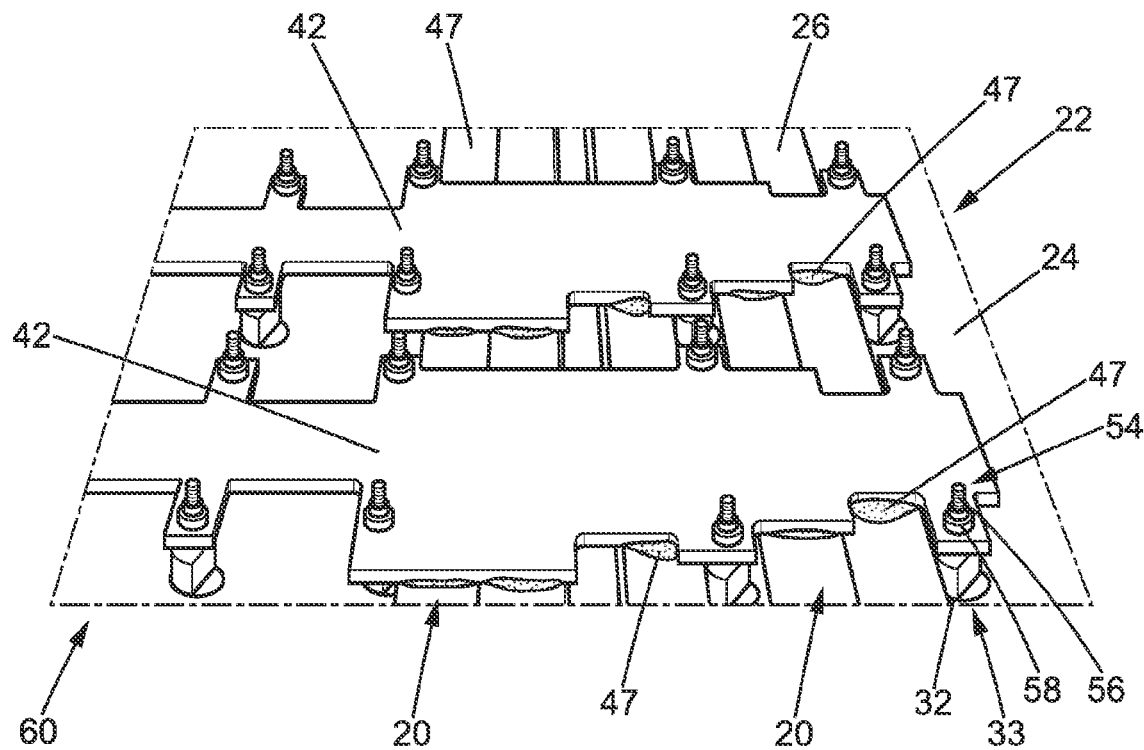
FIG. 7 is a perspective view of another exemplary portion of a spacecraft wall.

As the amount of thermally-conductive paste deposited on the upper face of the heat pipe is greater than the amount of paste needed to fill only the space between the capillary heat pipes 20 and the heat-emitting device 42, the thermally-conductive paste 40 overflows to each side of the heat-emitting device 42, as can be seen in FIGS. 6 and 7. This overflow 47 advantageously allows visually verifying that a sufficient amount of thermally-conductive paste 40 has been used to cover substantially the entire surface of the upper face 36 of the heat-emitting device.

Thus, advantageously, the height of the thermally-conductive layer 50 is independently adjusted to the height difference between the upper face 34 of the female attachment bodies 33 and the upper face 36 of the capillary heat pipes 20.

The layer 50 of thermally-conductive paste compensates exactly for the height difference D established between the upper face 34 of the spacers and the upper face 36 of the heat pipes. Thus, the manufacturing method according to the invention makes it possible to guarantee that the thermally-conductive paste 40 is well-integrated into the micro-roughnesses of the upper face 36 of the capillary heat pipes and into the micro-roughnesses of the lower face of the heat-emitting device 42.

Figure 8:
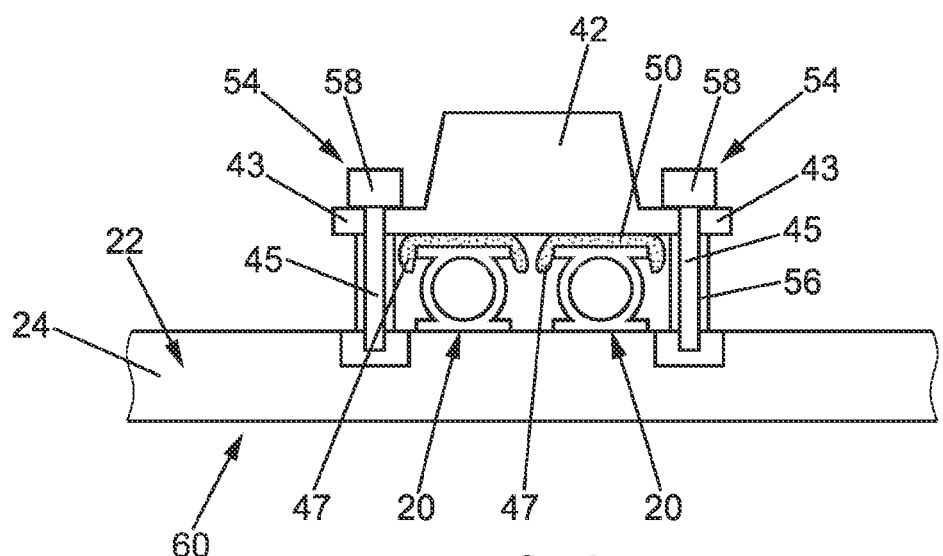
FIG. 8 is a schematic cross-sectional view of a spacecraft wall according to a first embodiment of the invention, said wall being manufactured according to the method illustrated in FIG. 2.

During a step 48, the assembly of heat-emitting device 42, thermally-conductive layer 50, and capillary heat pipes 20 is then attached to the panel 24 using male attachment members 54, as can be seen in FIG. 8.

The attachment method continues with a waiting step 52, during which the viscosity of the thermally-conductive paste 40 increases and the adhesion of the thermally-conductive paste increases. For example, this step may last two weeks. When the thermally-conductive paste 40 has hardened slightly, it forms a layer 50 of thermally-conductive paste which adheres to the capillary heat pipes 20 and to the heat-emitting device 42 so that the capillary heat pipes 20 and the heat-emitting device 42 are made integral.

In particular, the adhesion of the thermally-conductive layer 50 is sufficiently strong for the capillary heat pipes 20 and the heat-emitting device 42 to form an integral unit, and sufficiently weak to allow possible subsequent detachment of the heat-emitting device 42 from the capillary heat pipes 20. This detachment may be carried out in order to move or replace a heat-emitting device 42, for example following a change to the design of the spacecraft wall.

According to a preferred embodiment, each male attachment member 54 comprises a stud 56 and a nut 58. The stud 56 is engaged in the through-hole 45 of an attachment tab 43 of the heat-emitting device and in the through-channel of the spacer 32. The stud 56 is then screwed into the threaded insert 28. A nut 58 is screwed onto the free end of the stud 56.

According to the invention, the male attachment member 54 serves solely to attach the assembly of heat-emitting device 42, thermally-conductive layer 50, and capillary heat pipes 20 to the panel 24. It does not have the function of pressing on the thermally-conductive layer 50. For this reason, the number of points of attachment of a heat-emitting device 42 can therefore be low.

Advantageously, the use of a stud 56 and a nut 58 makes it possible to adapt to a wide variety of attachment heights. Accordingly, it is not necessary to order screws of different sizes. The number of assembly parts is reduced. The work of purchasing and managing assembly parts is simplified.

Alternatively, the male attachment member 54 comprises a screw.

Advantageously, as the capillary heat pipes 20 are located only between the female attachment bodies 33, the capillary heat pipes 20 do not have attachment holes, so "standard" heat pipes can be mounted between the heat-emitting devices and the panels 24. As a result, it is no longer necessary to order custom heat pipes and to manage an inventory of capillary heat pipes with attachment holes in different places.

The invention also relates to a spacecraft wall 60 obtained by carrying out the steps of the manufacturing method according to the first embodiment described above.

Referring to FIG. 8, the spacecraft wall 60 according to the invention comprises a panel 24, two capillary heat pipes 20 arranged on the main face 22 of the panel, a layer 50 of thermally-conductive paste placed on each capillary heat pipe 20, and a heat-emitting device 42 arranged on the layers 50 of thermally-conductive paste. A layer 50 of thermally-conductive paste is thus interposed between each capillary heat pipe 20 and the heat-emitting device 42.

As stated previously, the capillary heat pipes 20 comprise a hollow tube 25 and two support plates 27 arranged parallel to one another and diametrically opposite. The plates preferably have a width substantially equal to the diameter of the hollow tube 25.

The capillary heat pipes 20 are adjacent and parallel. They are located on the main face 22 of the panel 24.

As stated previously, the heat-emitting device 42 comprises attachment tabs 43 or edges equipped with attachment through-holes 45. These attachment tabs 43 or edges are cantilevered over the stack comprising the capillary heat pipes 20, the layers 50 of thermally-conductive paste, and the heat-emitting device 42.

The wall 60 of the spacecraft also comprises female attachment bodies 33 and male attachment members 54. The female attachment bodies 33 each comprise a threaded insert 28 fixed in the blind orifice 30 of the panel and a spacer 32 provided with a through-channel arranged in the axial extension of each threaded insert.

Each male attachment member 54 comprises a stud 56 having one end screwed into the threaded insert 28 and a nut 58 screwed on the other end of the stud. The stud 56 also traverses the through-hole 45 of the heat-emitting device 42 and the hollow channel of the spacer 32. The heat-emitting device 42 bears against and is in direct contact with the female attachment body 33, and more precisely with the spacer 32. There is no thermally-conductive paste between the heat-emitting device 42 and the spacer 32.

Alternatively, the number of female attachment bodies 33 and the number of male fasteners members 54 of the heat-emitting device is greater than two.

Alternatively, the number of capillary heat pipes 20 arranged under the heat-emitting device is greater than two.

Thus, in the example illustrated in FIG. 6, the wall 60 comprises a first capillary heat pipe 201, a second capillary heat pipe 202, and a heat-emitting device 42 arranged in the same longitudinal direction as the capillary heat pipes 201, 202. This heat-emitting device 42 is attached to the panel 24 by two male/female attachment assemblies 33, 54 attached on one side of the heat-emitting device and along a peripheral edge of the first heat pipe, and three male/female attachment assemblies 33, 54 attached on the other side of the heat-emitting device and along a peripheral edge of the second heat pipe 202.

In the example illustrated in FIG. 7, the wall 60 comprises five capillary heat pipes 20 and two heat-emitting devices 42 arranged transversely to the longitudinal axis of the capillary heat pipes 20. Each heat-emitting device 42 is attached to the panel 24 by three male/female attachment assemblies 33, 54 attached on one side of the heat-emitting device, and three male/female attachment assemblies 33, 54 attached on the other side of the heat-emitting device.

Figure 9:
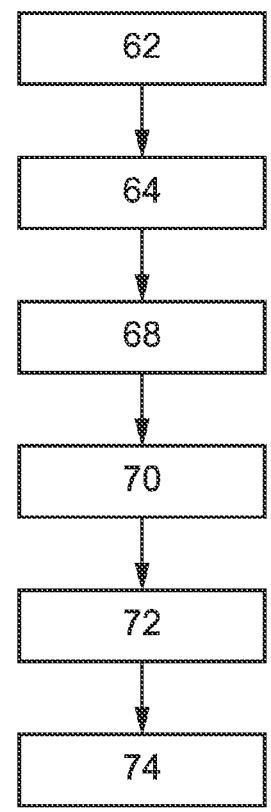
FIG. 9 is a diagram of the steps of the attachment method according to a second embodiment of the invention.
Figure 10:
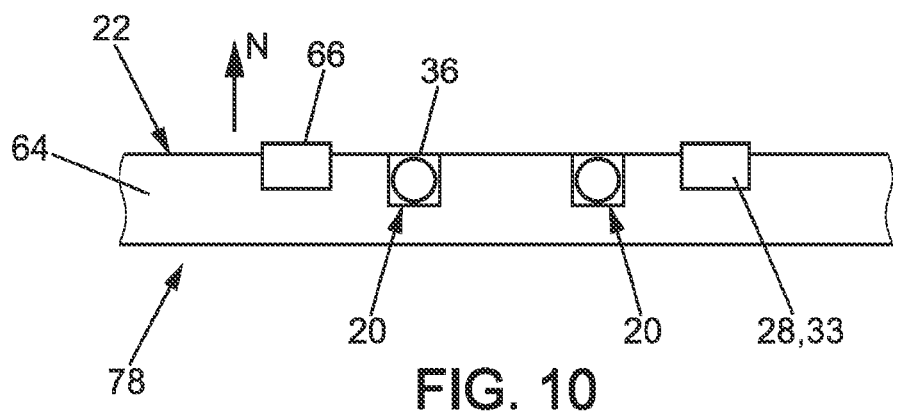
FIG. 10 is a schematic cross-sectional view of a spacecraft wall during an intermediate step of the attachment method illustrated in FIG. 9.

Referring to FIGS. 9 and 10, the manufacturing method according to the second embodiment of the invention begins with a step 62 during which two capillary heat pipes 20 are mounted in a panel 64 of a spacecraft. In particular, according to this second embodiment, the panel 64 is a honeycomb panel 64. The capillary heat pipes 20 are arranged in channels created in the panel 64. The upper face 34 of the capillary heat pipes is flush with the main face 22 of the panel 24. The capillary heat pipes 20 are parallel to one another, and preferably next to one another.

During a step 64, two threaded inserts 28 are fixed in a blind orifice 30 of the panel 24. The insertion depth of the threaded inserts 28 in the panel 24 is established such that the upper face 66 of the threaded inserts extends above the heat pipes. Thus, a height difference D of between 0.2 and 0.5 millimeter is preferably set up between the upper face 66 of the threaded inserts and the upper face 36 of the heat pipes.

Figure 11:
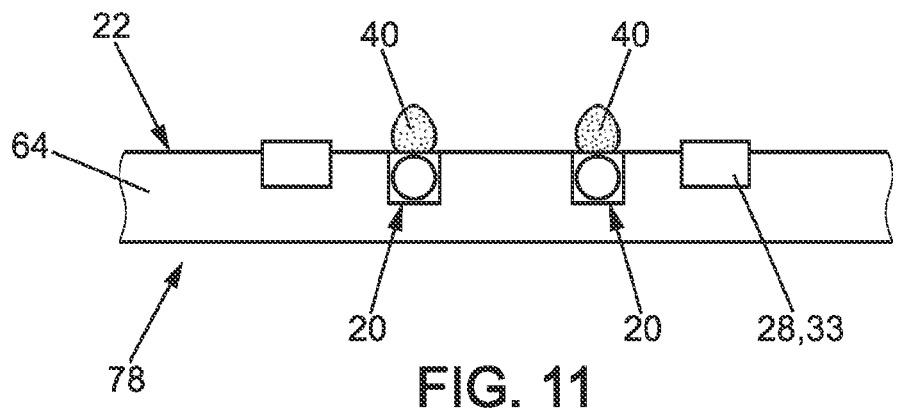
FIG. 11 is a schematic cross-sectional view of a spacecraft wall during another intermediate step of the attachment method illustrated in FIG. 9.

During a step 68 illustrated in FIGS. 9 and 11, a thermally-conductive paste 40 is arranged on at least a portion of the capillary heat pipes 20.

During a step 70, a heat-emitting device 42 is placed on the thermally-conductive paste 40 and on the female attachment bodies 33.

Steps 68 and 70 are respectively identical to step 38 and step 46 according to the first embodiment, and will not be described in detail a second time.

Figure 12:
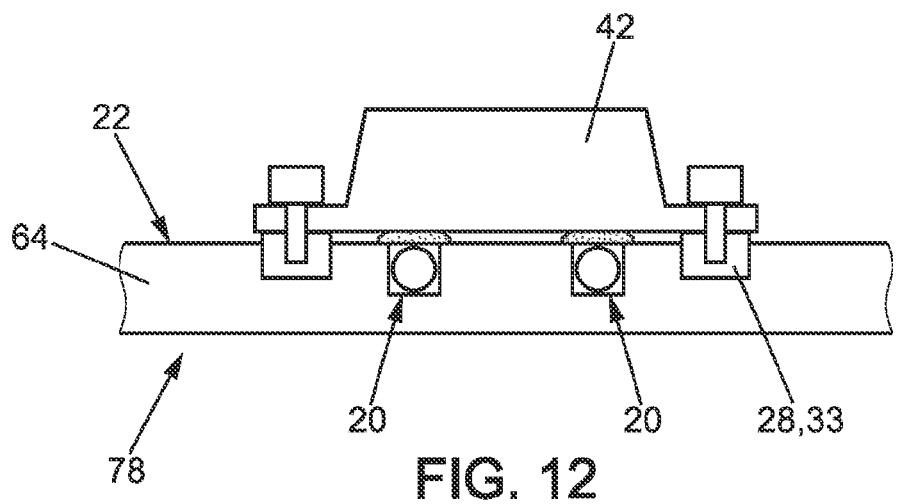
FIG. 12 is a schematic cross-sectional view of a spacecraft wall according to a second embodiment of the invention, said wall being manufactured according to the method illustrated in FIG. 9; and, FIG. 13 is a schematic view of a spacecraft comprising a wall according to the invention.

During a step 72 illustrated in FIGS. 9 and 12, the heat-emitting device 42 is attached to the panel 64 by means of at least one male attachment member 54. Each male attachment member 54 comprises a stud 56 and a nut 58. The stud 56 is engaged in the through-hole 45 of a mounting tab 43 or edge of the heat-emitting device and is screwed into the threaded insert 28. The nut 58 is screwed on the free end of the stud 56.

The method continues with a waiting step 74, identical to step 52 of the method according to the first embodiment.

The spacecraft wall 78 according to the second embodiment of the invention is obtained by carrying out the steps of the manufacturing method according to the second embodiment of the invention.

The spacecraft wall 78 according to the second embodiment is similar to the spacecraft wall 60 according to the first embodiment except that:

The panel 64 is a honeycomb panel, the capillary heat pipes 20 are arranged inside the panel 64 with their upper face 24 flush with the upper face 22 of the panel, the female attachment bodies 33 do not have a spacer 32, and the depth of insertion of the threaded inserts 28 into the panel 24 is established so that the upper face 66 of the threaded inserts extends above the heat pipes with a height difference D of between 0.2 and 0.5 millimeter.

Figure 13:
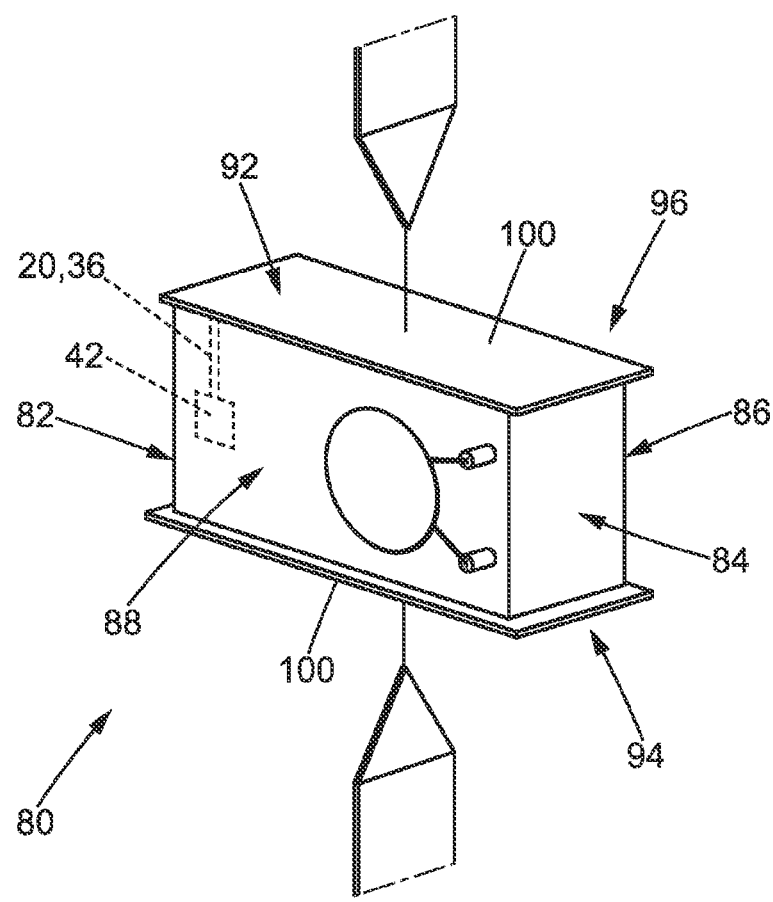

Referring to FIG. 13, the spacecraft 80 according to the invention is in the form of a parallelepipedal box comprising:

a wall 82 directed towards the Earth, and often called the Earth side 82, a wall 84 opposite and parallel to wall 82 and generally called the anti-Earth side, a wall 86, called the east side, perpendicular to the direction of movement of the spacecraft 80, a wall 88 opposite to wall 86, called the west side, a wall 92, called the north side 92, and perpendicular to the north-south axis of the Earth, and a wall 94 opposite to wall 92.

The inner and outer faces of the walls 82, 84, 86, 88, 92 and 94 carry heat-emitting devices 42 and capillary heat pipes 20, 64 contained in the shell. A single heat-emitting device 42 and a single heat pipe have been schematically represented, in order to simplify the figure.

Walls 92 and 94 carry radiators 100 thermally connected to the devices.

The invention claimed is:

1. A method for attaching a heat-emitting device and a capillary heat pipe to a panel of a spacecraft wall, comprising:
    a) arranging at least one capillary heat pipe on at least a portion of the panel;
    b) attaching female attachment bodies to the panel, the female attachment bodies protruding from said at least one capillary heat pipe;
    c) placing a thermally-conductive and self-curing paste on at least a portion of the at least one capillary heat pipe or on at least one heat-emitting device,
    d) placing the at least one heat-emitting device on the thermally-conductive and self-curing paste and on the female attachment bodies, said heat-emitting device bearing against the female attachment bodies, said heat-emitting device is in direct contact with the female attachment bodies, and
    e) attaching the heat-emitting device and said at least one capillary heat pipe to the panel by attaching male attachment members to the female attachment bodies.

2. The method according to claim 1, wherein the thermally-conductive paste comprises a silicone resin containing alumina powder.

3. The method according to claim 1, wherein the male attachment member comprises a stud and at least one nut.

4. The method according to claim 1, wherein the step of placing the thermally-conductive paste on the capillary heat pipe is carried out by depositing drops or a thin line of thermally-conductive paste, and wherein the amount of thermally-conductive paste deposited on the at least one capillary heat pipe is at least one and a half times greater than the amount of thermally-conductive paste needed to fill only a space between the capillary heat pipe and the heat-emitting device.

5. The method according to claim 1, further comprising a step of waiting for viscosity of the thermally-conductive paste to increase to a threshold value.

6. The method according to claim 1, wherein the capillary heat pipe comprises a hollow tube and two support plates arranged one on either side of the hollow tube, and wherein said support plates have a width substantially equal to a diameter of the hollow tube.

7. The method according to claim 1, wherein the female attachment bodies are attached to the panel so as to protrude relative to said at least one capillary heat pipe in a direction (N) perpendicular to a main face of the panel.

8. The method according to claim 1, wherein the female attachment bodies further comprise at least one threaded insert.

9. The method according to claim 8, wherein the female attachment bodies further comprise a spacer comprising a hollow channel, said spacer is arranged in an axial extension of the threaded insert.

10. The method according to claim 1, wherein the thermally-conductive paste comprises a thermosetting resin.

11. A spacecraft wall, comprising:
a panel,
at least one capillary heat pipe arranged on at least a portion of the panel,
female attachment bodies attached to the panel so as to protrude relative to said at least one capillary heat pipe,
at least one heat-emitting device carried by and in direct contact with said female attachment bodies,
a layer of thermally-conductive and self-curing paste arranged between said at least one capillary heat pipe and the heat-emitting device, and
a male attachment member suitable for attaching said heat-emitting device to the female attachment body.

12. The spacecraft wall according to claim 11, wherein the thermally-conductive paste comprises a silicone resin containing alumina powder.

13. The spacecraft wall according to claim 1, wherein the male attachment member comprises a stud and at least one nut.

14. The spacecraft wall according to claim 11, wherein said at least one capillary heat pipe comprises a hollow tube and two support plates arranged one on either side of the hollow tube, and wherein said support plates have a width substantially equal to a diameter of the hollow tube.

15. The spacecraft wall according to claim 11, wherein the female attachment bodies protrude relative to said least one capillary heat pipe in a direction (N) perpendicular to a main face of the panel.

16. The spacecraft wall according to claim 11, wherein the female attachment bodies further comprise at least one threaded insert.

17. The spacecraft wall according to claim 16, wherein the female attachment body comprises a spacer comprising a hollow channel, said spacer protruding relative to the support plates of said capillary heat pipe and are arranged in an axial extension of the threaded insert.

18. The spacecraft wall according to claim 11, wherein the thermally-conductive paste comprises a thermosetting resin.

19. The spacecraft wall according to claim 11, wherein said heat-emitting device is a device among: an amplifier, a radio frequency electronic component, a digital electronic component, a processor, an electrical power supply.

20. A spacecraft comprising at least one spacecraft wall according to claim 11.

* * * * *